(12) United States Patent
Leone et al.

(10) Patent No.: US 9,464,596 B2
(45) Date of Patent: Oct. 11, 2016

(54) SYSTEMS AND METHODS FOR SEPARATION OF LIQUID AND GASEOUS FUEL FOR INJECTION

(71) Applicant: Ford Global Technologies, LLC, Dearborn, MI (US)

(72) Inventors: Thomas G. Leone, Ypsilanti, MI (US); Mark Allen Dearth, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 279 days.

(21) Appl. No.: 14/152,869

(22) Filed: Jan. 10, 2014

(65) Prior Publication Data
US 2015/0198118 A1    Jul. 16, 2015

(51) Int. Cl.
| | |
|---|---|
| F02B 13/00 | (2006.01) |
| F02M 21/06 | (2006.01) |
| F02M 43/00 | (2006.01) |
| F02D 19/06 | (2006.01) |
| F02D 19/08 | (2006.01) |
| F02D 41/00 | (2006.01) |

(52) U.S. Cl.
CPC ............ *F02M 21/06* (2013.01); *F02D 19/061* (2013.01); *F02D 19/0605* (2013.01); *F02D 19/0647* (2013.01); *F02D 19/0671* (2013.01); *F02D 19/0689* (2013.01); *F02D 19/0692* (2013.01); *F02D 19/084* (2013.01); *F02D 41/0025* (2013.01); *F02D 41/0027* (2013.01); *F02M 43/00* (2013.01); *Y02T 10/36* (2013.01)

(58) Field of Classification Search
CPC .................................................. F02D 41/0025
USPC .................................................. 123/575–578
See application file for complete search history.

(56) References Cited

U.S. PATENT DOCUMENTS

| | | | |
|---|---|---|---|
| 5,117,802 A | 6/1992 | Durbin | |
| 5,816,224 A | 10/1998 | Welsh et al. | |
| 6,543,423 B2 | 4/2003 | Dobryden et al. | |
| 6,584,780 B2 | 7/2003 | Hibino et al. | |
| 8,015,951 B2* | 9/2011 | Dearth | F02D 19/081 |
| | | | 123/1 A |
| 8,342,158 B2 | 1/2013 | Ulrey et al. | |
| 2005/0005915 A1* | 1/2005 | Saito | F02D 9/02 |
| | | | 123/516 |
| 2011/0061622 A1 | 3/2011 | Lund | |
| 2013/0000607 A1 | 1/2013 | Watanabe | |
| 2013/0013183 A1 | 1/2013 | Surnilla et al. | |
| 2013/0073183 A1* | 3/2013 | Cohn | F02D 41/3094 |
| | | | 701/104 |
| 2013/0160741 A1 | 6/2013 | Sommars et al. | |

OTHER PUBLICATIONS

Leone, Thomas G. et al., "Refueling Systems and Methods for Mixed Liquid and Gaseous Fuel," U.S. Appl. No. 14/051,312, filed Oct. 10, 2013, 36 pages.
Leone, Thomas G. et al., "Refueling Systems and Methods for Mixed Liquid and Gaseous Fuel," U.S. Appl. No. 14/051,333, filed Oct. 10, 2013, 36 pages.

(Continued)

*Primary Examiner* — John Kwon
(74) *Attorney, Agent, or Firm* — Julia Voutyras; Alleman Hall McCoy Russell & Tuttle LLP

(57) ABSTRACT

A method for an engine may comprise, on board a vehicle, supplying fuel from a fuel tank to a fuel separator, wherein the fuel comprises a gaseous fuel solubilized in a liquid fuel, desolubilizing the gaseous fuel from the liquid fuel in the fuel separator, and separating the gaseous fuel from the liquid fuel in the fuel separator.

8 Claims, 4 Drawing Sheets

(56) References Cited

OTHER PUBLICATIONS

Lannug, Axel et al., "The Solubility of Methane in Hydrocarbons, Alcohols, Water and Other Solvents," ACTA Chemica Scandinavica 14, pp. 1124-1128, Copenhagen, Denmark, 1960, 5 pages.

Sebastian, Herbert M. et al., "Correlation of the Solubility of Methane in Hydrocarbon Solvents," Ind. Eng. Chem. Fundam., 1981, vol. 20, No. 4, pp. 346-349, American Society, 4 pages.

Leone, Thomas G. et al., "Systems and Methods for Determining Amount of Liquid and Gaseous Fuel," U.S. Appl. No. 14/151,683, filed Jan. 9, 2014, 39 pages.

* cited by examiner

SYSTEMS AND METHODS FOR SEPARATION OF LIQUID AND GASEOUS FUEL FOR INJECTION

BACKGROUND AND SUMMARY

Compressed natural gas (CNG) is a high octane fuel that is beneficial for reducing engine knock, for reducing hydrocarbon emissions in cold start events, and for reducing carbon dioxide emissions during engine operations. However, CNG has a low energy density compared to liquid hydrocarbon fuels, such as diesel fuel or gasoline. To increase the range and total fuel quantity stored in a vehicle, CNG may be utilized in conjunction with gasoline or diesel fuel, requiring the vehicle to switch between fuels for optimal performance. However, inclusion of separate fuel tanks, one tank for gaseous fuel and one tank for liquid fuel, may not be suitable in a vehicle due to space constraints. A preferable system may be one that stores liquid fuel and pressurized gaseous fuel together in the same fuel tank. In particular, CNG is substantially soluble in gasoline or diesel fuel when stored together at a relatively low pressure (~100 psi).

The inventors herein have recognized potential issues with the above approach. Namely, fuel metering accuracy may be decreased because liquid fuel supplied from the fuel tank may contain a mixture of liquid fuel and solubilized gaseous fuel, and the gaseous fuel may form bubbles during fuel injection. Furthermore, formation of gaseous fuel bubbles may adversely change the dispersion of injected fuel in the engine, reducing fuel economy and engine efficiency.

One approach which at least partially addresses the above issues comprises a method for an engine, comprising on board a vehicle, supplying fuel from a fuel tank to a fuel separator, wherein the fuel comprises a gaseous fuel solubilized in a liquid fuel, desolubilizing the gaseous fuel from the liquid fuel in the fuel separator, and separating the gaseous fuel from the liquid fuel in the fuel separator.

In another embodiment, a method may comprise on board a vehicle, storing fuel in a fuel tank, wherein the fuel comprises a gaseous fuel solubilized in a liquid fuel, during a first condition, desolubilizing and separating the gaseous fuel from the liquid fuel in a fuel separator, and supplying the gaseous fuel and the liquid fuel to fuel injectors, and during a second condition, supplying fuel from the fuel tank to the fuel injectors while bypassing the fuel separator.

In another embodiment, a fuel system may comprise a fuel tank on board a vehicle, the fuel tank including a gaseous fuel dissolved in a liquid fuel, a fuel injection system downstream from the fuel tank, the fuel injection system including gaseous fuel injectors and liquid fuel injectors, and a fuel separator fluidly coupled between the fuel tank and the fuel injection system.

In this way, the technical result may be achieved in that a consistent dispersion of injected fuel in engine cylinders can be maintained while providing more robust and accurate fuel injection control so that engine emissions may be reduced and fuel economy and engine efficiency may be increased. The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically depicts an example cylinder of an internal combustion engine.

DETAILED DESCRIPTION

Figure 1:
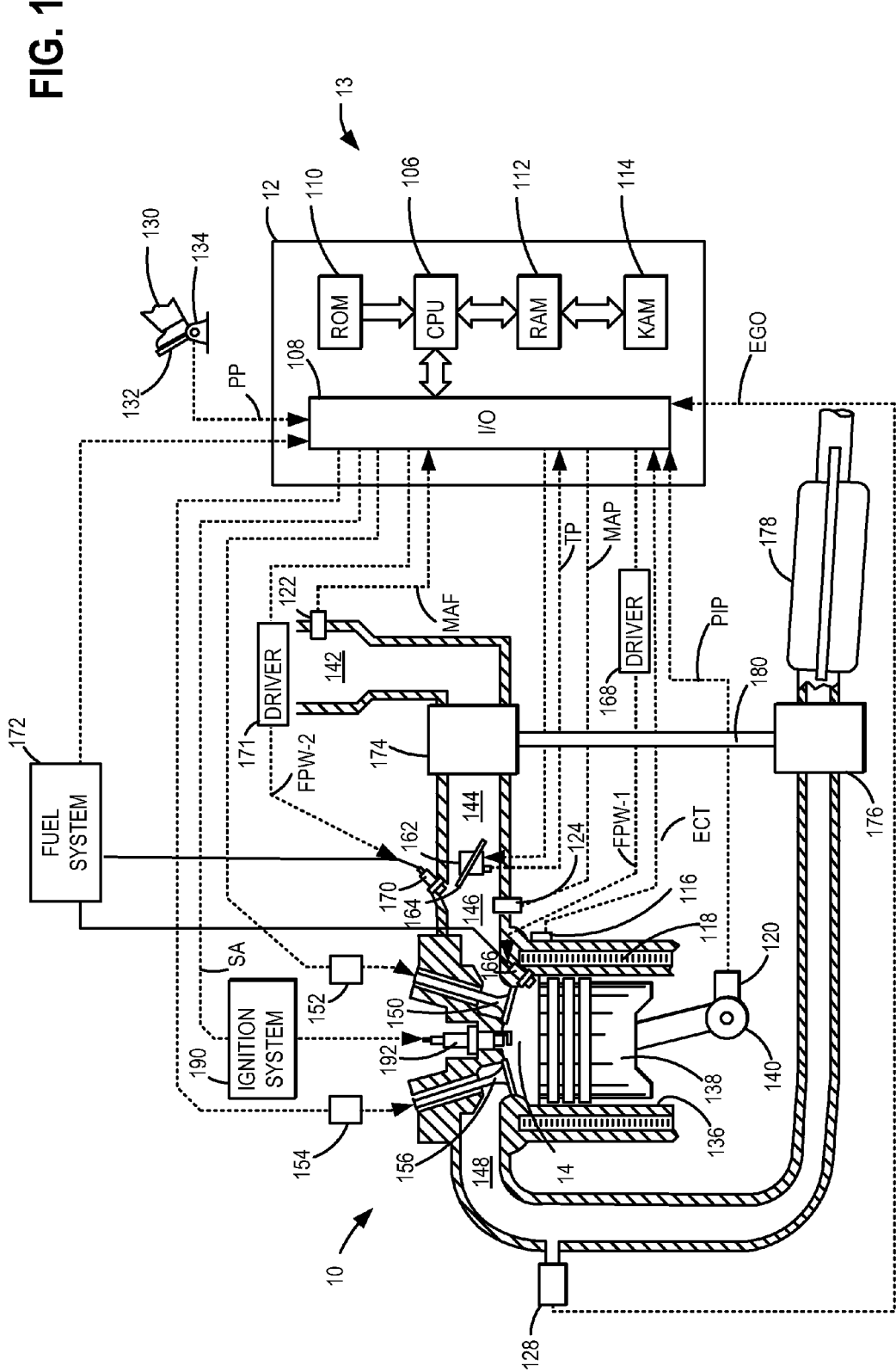
Figure 2:
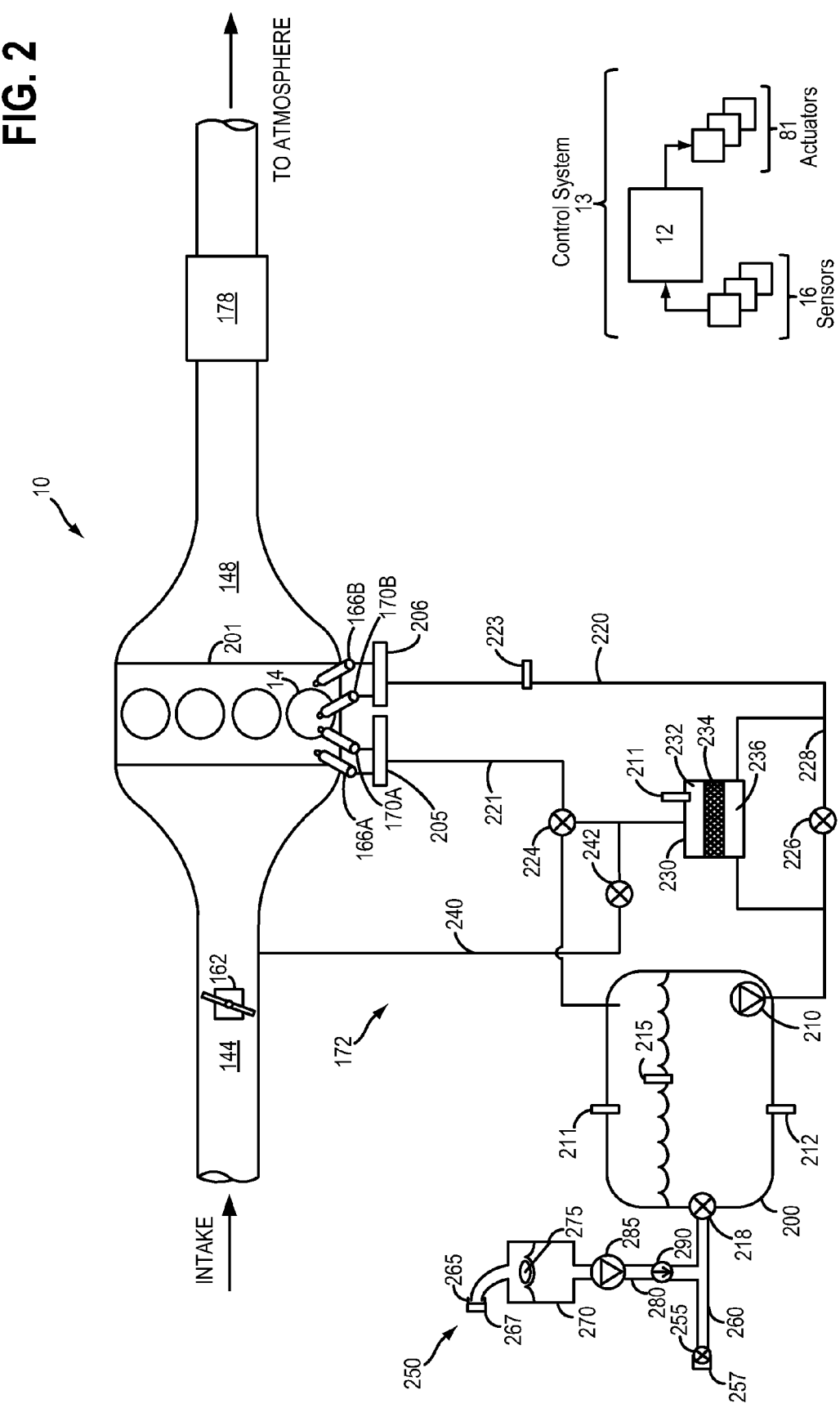
FIG. 2 shows a schematic depiction of the engine of FIG. 1 and a fuel system configured to operate on a mix of gaseous fuel and liquid fuel.
Figure 3:
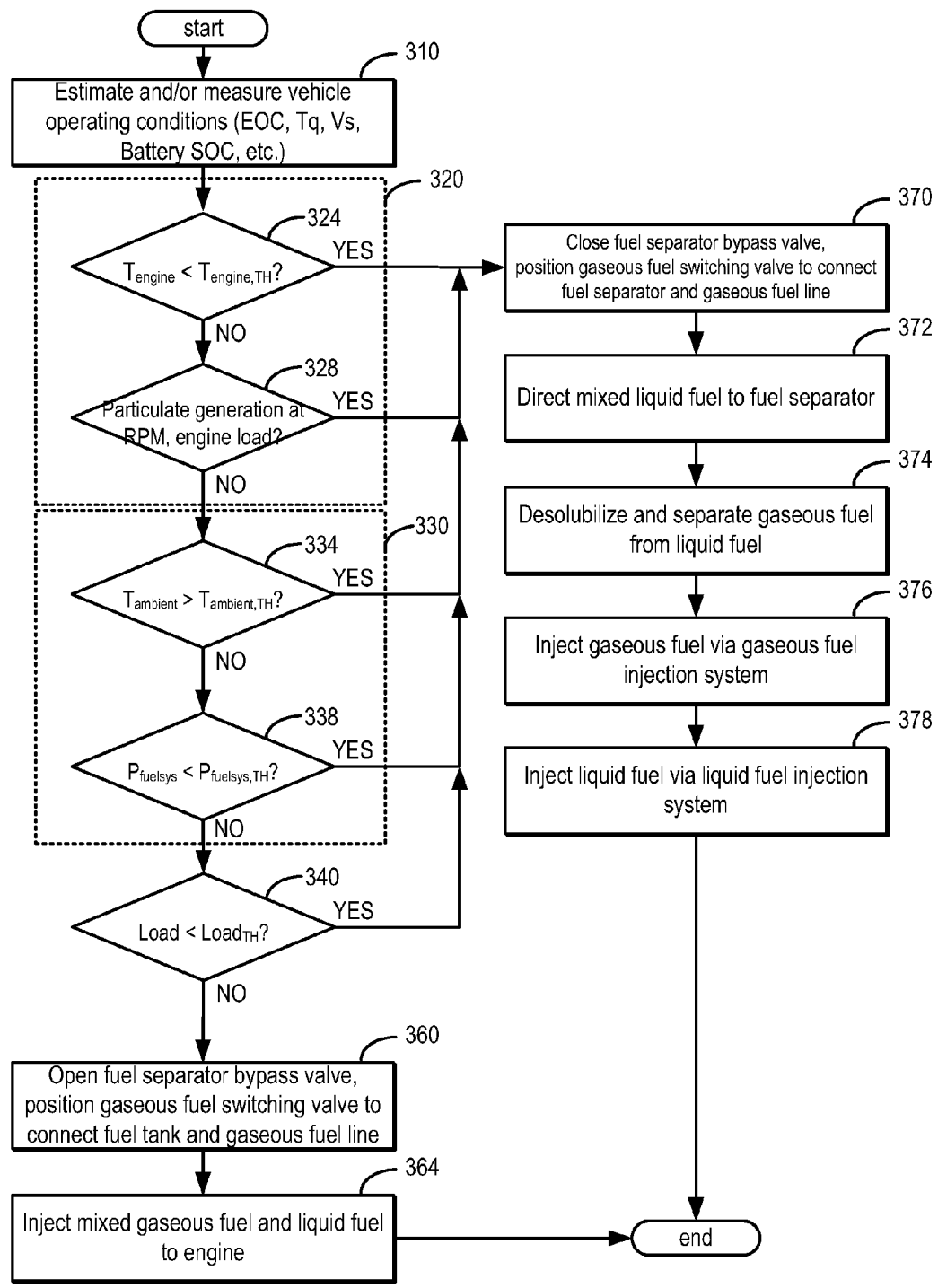
FIG. 3 shows a flow chart of an example method for operating the engine and fuel system of FIGS. 1-2.
Figure 4:
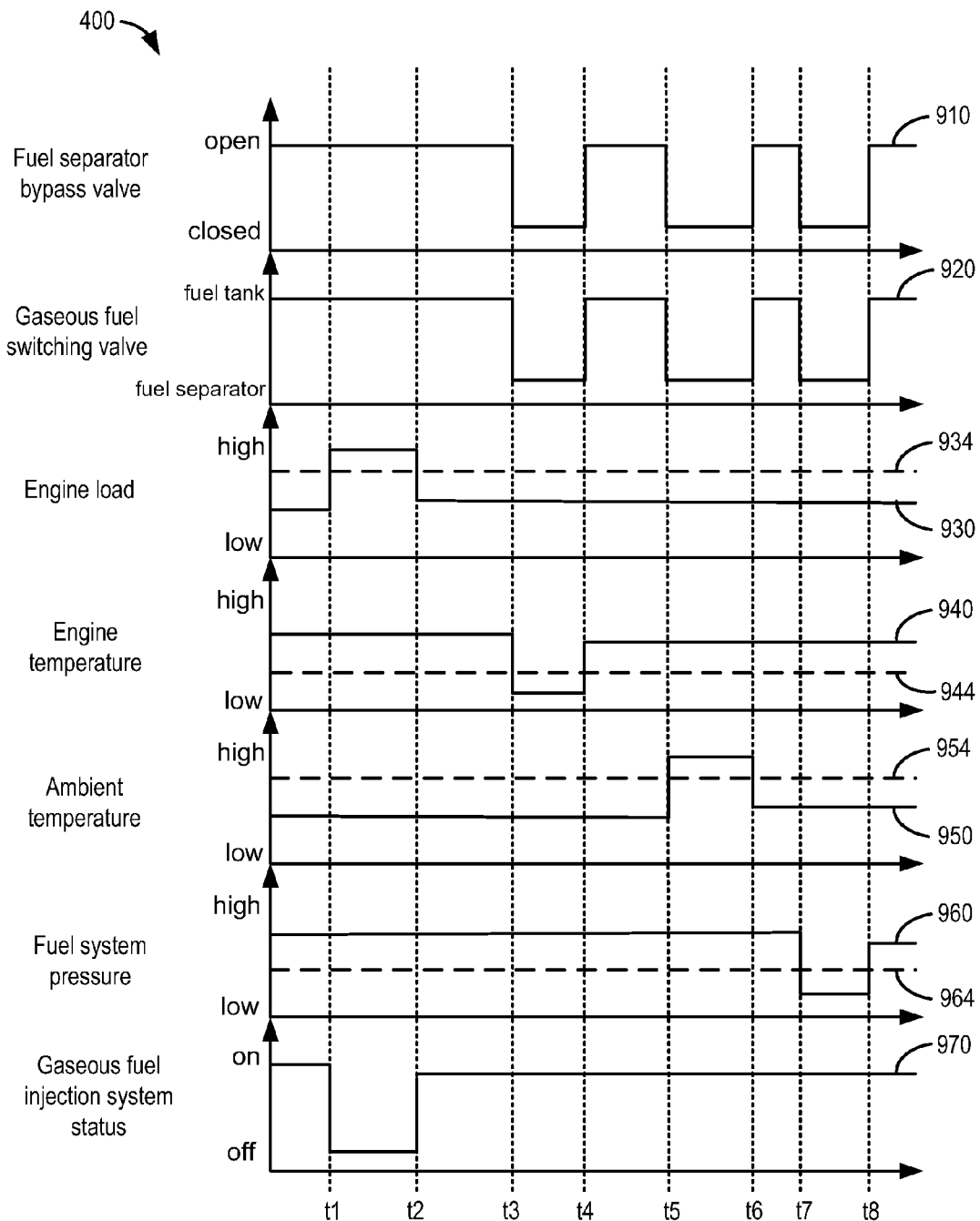
FIG. 4 shows an example timeline for operating the engine and fuel system of FIGS. 1-2.

The present description relates to systems and methods for supplying gaseous fuel and liquid fuel to an engine and fuel system. An example internal combustion engine and fuel system is illustrated in FIGS. 1 and 2. FIG. 3 illustrates a flow chart for a method of operating an engine and fuel system to supply gaseous fuel and/or liquid fuel to the engine. FIG. 4 is an example timeline representing supplying gaseous fuel and/or liquid fuel from the fuel system to the engine during various engine operating conditions.

Turning now to FIG. 1, it depicts an example embodiment of a combustion chamber or cylinder of internal combustion engine 10. Engine 10 may be controlled at least partially by a control system 13, including controller 12, and by input from a vehicle operator 130 via an input device 132. In one example, input device 132 includes an accelerator pedal and a pedal position sensor 134 for generating a proportional pedal position signal PP. Cylinder (e.g., combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may aid in mixing and combustion when operating the engine with an alcohol-based fuel due to the lower volatility of some alcohol-based fuels. Alternatively, the injector may be located overhead and near the intake valve to aid in mixing of intake air and injected fuel. Fuel may be delivered to fuel injector 166 from fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, although not shown in FIG. 1, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the air intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions such as described herein below. The relative distribution of the total injected fuel among injectors 166 and 170 may be referred to as a first injection ratio. For example, injecting a larger amount of the fuel for a combustion event via (port) injector 170 may be an example of a higher first ratio of port to direct injection, while injecting a larger amount of the fuel for a combustion event via (direct) injector 166 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used. Furthermore the injection ratios may be adjusted based on one or more engine operating conditions such as engine load, engine speed, fuel system pressure, engine temperature, and the like. In this way one or both of liquid and gaseous fuels may be combusted in an engine cylinder.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved. Further still, fuel injectors 166 and 170 may each include one or more gaseous fuel injectors for injecting gaseous fuel, and one or more liquid fuel injectors for injecting liquid fuel.

Fuel system 172 may include one fuel tank or multiple fuel tanks. In embodiments where fuel system 172 includes multiple fuel tanks, the fuel tanks may hold fuel with the same fuel qualities or may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc. In some examples, fuel system 172 may include a fuel tank that holds a liquid fuel, such as gasoline, and also holds a gaseous fuel, such as CNG. A portion of the gaseous fuel may be solubilized in the liquid fuel. The liquid fuel and the gaseous fuel together may be referred to as a mixed fuel, and the fuel tank 200 may thus store or hold a mixed fuel. Fuel injectors 166 and 170 may be configured to inject fuel from the same fuel tank, from different fuel tanks, from a plurality of the same fuel tanks, or from an overlapping set of fuel tanks. While FIG. 1 depicts fuel injector 166 as a direct fuel injector and fuel injector 170 as a port fuel injector, in other embodiments both injectors 166 and 170 may be configured as port fuel injectors or may both be configured as direct fuel injectors.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. Example routines that may be performed by the controller are described herein and with regards to FIGS. 3 and 4.

Turning now to FIG. 2, it shows a schematic diagram of a multi-cylinder engine in accordance with the present disclosure. As depicted in FIG. 1, internal combustion engine 10 includes cylinders 14 coupled to intake passage 144 and exhaust passage 148. Intake passage 144 may include throttle 162. Exhaust passage 148 may include emissions control device 178. Control system 13, including controller 12, may receive signals from various sensors 16, and additional sensors shown in FIGS. 1 and 2, and output signals to various actuators 81, including additional actuators shown in FIGS. 1 and 2.

Cylinders 14 may be configured as part of cylinder head 201. In FIG. 2, cylinder head 201 is shown with 4 cylinders in an inline configuration. In some examples, cylinder head 201 may have more or fewer cylinders, for example six cylinders. In some examples, the cylinders may be arranged in a V configuration or other suitable configuration.

Cylinder head 201 is shown coupled to fuel system 172. Cylinder 14 is shown coupled to fuel injectors 166A and 166B, and fuel injectors 170A and 170B. Although only one cylinder is shown coupled to fuel injectors, it is to be understood that all cylinders 14 included in cylinder head 201 may also be coupled to one or more fuel injectors. In this example embodiment, fuel injectors 166A and 166B are depicted as a direct fuel injector and fuel injectors 170A and 170B are depicted as a port fuel injector. Although only two direct injectors and two port injectors are shown in FIG. 2, it is to be understood that engine 10 may comprise more than two direct injectors and more than two fuel injectors. Each fuel injector may be configured to deliver a specific quantity of gaseous and/or liquid fuel at a specific time point in the engine cycle in response to commands from controller 12. One or more fuel injectors may be utilized to deliver combustible fuel to cylinder 14 during each combustion cycle. The timing and quantity of fuel injection may be controlled as a function of engine operating conditions.

Fuel system 172 includes fuel tank 200. Fuel tank 200 may include a liquid fuel, such as gasoline, diesel fuel, or a gasoline-alcohol blend (e.g. E10, E85, M15, or M85), and may also include a gaseous fuel, such as CNG. Fuel tank 200 may be configured to store liquid fuel and gaseous fuel together at a relatively low pressure compared to conventional CNG storage (e.g. 200-250 atmospheres). For example, the gaseous fuel may be added to a pressure of 100 atmospheres. In this way, a portion of the gaseous fuel may be dissolved in the liquid fuel. At 100 atmospheres, CNG may dissolve in gasoline to the point where 40% of the liquid fuel component in fuel tank 200 is CNG. Fuel tank 200 may include pressure sensor 211, temperature sensor 212, and liquid level sensor 215.

Liquid fuel and/or gaseous fuel may be supplied from fuel tank 200 to cylinders 14 of engine 10 via liquid fuel line 220 and gaseous fuel line and 221, fuel rails 205 and 206 and fuel injectors 166A, 166B, 170A, and 170B. In one example, gaseous fuel may be delivered from fuel tank 200 by positioning three-way gaseous fuel switching valve 224 to fluidly couple fuel tank 200 to gaseous fuel line 221 and gaseous fuel rail 205. Gaseous fuel delivered to gaseous fuel rail 205 may be port fuel injected to cylinder 14 by gaseous fuel injector 170B, and may be directly injected to cylinder 14 by liquid fuel injector 170A. Liquid fuel, including solubilized gaseous fuel in the liquid fuel, may be supplied from fuel tank 200 by operating fuel lift pump 210. Liquid fuel line 220 may be coupled to a lower portion of fuel tank 200 in order draw liquid fuel from fuel tank 200 via fuel lift pump 210. In some cases, fuel lift pump 210 may be omitted from fuel system 172. In such embodiments, the pressure of gaseous fuel stored in fuel tank 200 may be used to drive liquid fuel from fuel tank 200 to fuel rail 205 via fuel line 220. In embodiments where fuel lift pump 210 is omitted, an additional liquid fuel valve may be coupled to fuel line 220 to control liquid fuel flow through fuel line 220. If fuel separator bypass valve 226 is open, liquid fuel may be delivered via bypass fuel line 228 to liquid fuel line 220 and liquid fuel rail 206, where liquid fuel may be directly injected into cylinder 14 via liquid fuel injector 166A and/or port fuel injected into cylinder 14 liquid fuel injector 166B. In the case of fuel systems comprising more than one fuel tank comprising gaseous fuel and liquid fuel stored therein, each fuel tank may be fluidly coupled to fuel separator 230 to enable separation of the gaseous fuel and the liquid fuel prior to fuel injection.

In one example, gaseous fuel rail 205 may comprise a DI gaseous fuel rail for direct injecting gaseous fuel via one or more DI gaseous fuel injectors 170A and a PFI gaseous fuel rail for port injection of gaseous fuel via one or more PFI liquid fuel injectors 170B. In other examples, only a DI gaseous or only a PFI gaseous injection system may be used. Furthermore, liquid fuel rail 206 may comprise a DI liquid fuel rail for direct injecting liquid fuel via one or more DI liquid fuel injectors 166A and a PFI liquid fuel rail for port injection of liquid fuel via one or more PFI liquid fuel injectors 166B. In other examples, only a DI liquid or only a PFI liquid injection system may be used. Further still, a DI gaseous fuel pump may be provided upstream of DI gaseous fuel rail and downstream of gaseous fuel switching valve 224 for delivering pressurized gaseous fuel to DI gaseous fuel rail. Further still, a DI liquid fuel pump may be provided upstream of DI liquid fuel rail and downstream of bypass fuel line 228 for delivering pressurized liquid fuel to DI liquid fuel rail. Further still, a single DI fuel pump may be used to deliver both gaseous fuel and liquid fuel. Although not shown in FIG. 2, DI liquid fuel pump may be a high pressure fuel pump comprising a solenoid activated inlet check valve, a piston, and an outlet check valve for delivering high pressure liquid fuel to DI liquid fuel rail. Injection of liquid fuel via DI liquid fuel injection pump may lubricate the piston of liquid DI fuel pump, thereby reducing pump wear and degradation and reducing pump NVH.

If fuel separator bypass valve is closed, liquid fuel supplied from fuel tank 200 may be delivered to fuel separator 230. As an example, fuel separator 230 may comprise a coalescer or other known processing unit for separating liquids and gases. Fuel separator 230 may comprise a coalescing filter 234, and an expansion chamber 232 on a downstream side thereof and a sump chamber 236 on an upstream side thereof. Liquid fuel may be supplied to the sump chamber 236 and/or the coalescing filter 234 at a fuel pressure of fuel lift pump 210. A pressure differential may be maintained across coalescing filter 234 wherein a pressure in expansion chamber 232 may be less than the fuel pressure in the sump chamber 236. For example, the pressure differential may be maintained by controlling lift pump 210 to supply sufficient pressure. Furthermore, coalescing filter may comprise a fritted filter, such as a steel fitted filter. Expansion chamber 232 may also be described as a manifold chamber.

In one example, the pressure differential may be maintained across coalescing filter 234 by a check valve 242 positioned downstream of the fuel separator 230 and fluidly coupled to the expansion chamber 232 via a gaseous fuel relief passage 240. The check valve 242 may be configured to open when a pressure upstream of the check valve exceeds a threshold pressure, for example, an intake manifold pressure. The outlet of the check valve 242, via the gaseous fuel relief passage 240, may be fluidly coupled to the intake manifold and/or a positive crankcase ventilation (PCV) system of engine 10. In this way, separated gaseous fuel may be supplied to the intake manifold and/or the engine crankcase where it may be used to aid in reducing oil viscosity and in lubricating the engine components.

For example, a pressure in the expansion chamber 232 may be less than a threshold pressure. The pressure in expansion chamber 232 may be measured by pressure sensor 238 and communicated to controller 12. In one example, the threshold pressure may comprise a pressure less than 100 psi. Below 100 psi, the solubility of CNG, methane, and other gaseous fuels may be reduced such that an amount of solubilized gaseous fuel in the liquid fuel may be very low. For example, the solubility of gaseous fuel (volume gaseous fuel dissolved per volume of liquid fuel) may be approximately 1 mL/mL per atmospheres of gaseous fuel pressure. Accordingly, upon entering the fuel separator 230, gaseous fuel solubilized in the liquid fuel may be desolubilized and volatilized from the liquid fuel, and may be conveyed across the coalescing filter 234 into the expansion chamber 232 and out of fuel separator 230 towards gaseous fuel switching valve 224. Furthermore, positioning the three-way gaseous fuel switching valve 224 to fluidly connect the fuel separator 230 to gaseous fuel rail 205 may supply the desolubilized gaseous fuel to gaseous fuel rail 205. Subsequently, desolubilized gaseous fuel may be injected to cylinder 14 via gaseous fuel injectors 170A and 170B.

Volatilization of the gaseous fuel from the liquid fuel may decrease the liquid and gaseous fuel temperatures and may cool the coalescing filter 234. Furthermore, the lowered liquid fuel temperature may reduce the volatility of the liquid fuel so that entrainment of lighter hydrocarbon fuel components into the desolubilized gaseous fuel stream may be reduced. Any entrained hydrocarbon components in the liquid fuel, such as residual butanes, pentanes, and hexanes, may volatilize and be entrained by the desolubilized gaseous fuel in the fuel separator. Accordingly, the octane value of the liquid fuel may thus be slightly raised, while the octane value of the gaseous fuel may be slightly reduced. Furthermore, recompression of the gaseous fuel downstream of the fuel separator may condense these residual hydrocarbon components.

Liquid fuel delivered to the fuel separator 230 may flow through sump chamber 236 and out of fuel separator 230 towards bypass fuel line 228 and liquid fuel line 220. A portion of liquid fuel delivered to fuel separator 230 may condense as droplets on and within coalescing filter 234. As the droplets of liquid fuel flow through the coalescing filter 234, they may merge and coalesce, thereby forming larger droplets, which may be conveyed by gravity back to the sump chamber 236.

Although in FIG. 2, the sump chamber 236, coalescing filter 234, and expansion chamber 232 are illustrated as being arranged in a linear fashion, other arrangements may also be included. For example, the sump chamber 236, coalescing filter 234, and expansion chamber 232 may be arranged in a concentric configuration wherein the expansion chamber is encircled by the coalescing filter 234 and the sump chamber 236, and wherein the fuel flowing into and out of the fuel separator 230 flows in an axial and/or radial direction with respect to the concentric configuration. Furthermore, sump chamber 236 may be fluidly connected to expansion chamber 232 via coalescing filter 234.

In this way, solubilized gaseous fuel in the liquid fuel may be desolubilized and separated from the liquid fuel before injection of liquid fuel into cylinder 14. Furthermore, gaseous fuel may be injected separately from liquid fuel to cylinder 14 via gaseous fuel injectors 170A and 170B. In other words, gaseous fuel may be injected only via gaseous fuel injectors and liquid fuel may be injected only via liquid fuel injectors. Furthermore, only gaseous fuel may be injected by switching off liquid fuel injection, or only liquid fuel may be injected by switching off gaseous fuel injection. Gaseous fuel may comprise one or more of compressed natural gas (CNG), methane, propane, and butane as non-limiting examples, while liquid fuel may comprise one or more of gasoline, alcohol, and diesel fuel, as non-limiting examples.

For example, injection of gaseous fuel may be increased because gaseous fuel may be lower cost, lower carbon intensity (e.g., lower $CO_2$ generating), higher octane, and the like, relative to liquid fuel. However, at high engine loads (especially when port fuel injecting gaseous fuel), injection of only gaseous fuel without injection of liquid fuel may reduce engine operability because the gaseous fuel may displace air (e.g., intake air entering the cylinder and/or at the intake air passage) and reduce engine efficiency (e.g., adversely alter the fuel to air ratio). Thus, at engine loads greater than a threshold load, injection of solubilized gaseous fuel in liquid fuel may be performed. Furthermore, at engine loads greater than a threshold load and when port fuel injection is ON, injection of solubilized gaseous fuel in liquid fuel may be performed.

Separation of solubilized gaseous fuel from the liquid fuel may be performed when engine operating conditions and fuel system conditions may lead to fuel delivery issues arising from generation of gaseous fuel bubbles in the liquid fuel. For example, under high fuel system temperatures (e.g., high ambient temperature or high under-hood temperature), under low fuel system pressure, gaseous fuel may be likely to form bubbles as the solubilized gaseous fuel in liquid fuel is conveyed through the fuel system towards the cylinder. Thus, under conditions where an ambient temperature is greater than a threshold ambient temperature, an under-hood temperature is greater than a threshold under-hood temperature, or a fuel system pressure is lower than a threshold fuel system pressure, fuel separator bypass valve 226 may be closed to direct liquid fuel through fuel separator 230, thereby separating solubilized gaseous fuel from liquid fuel in order to reduce formation of gaseous fuel bubbles and to increase fuel delivery reliability and robustness. Ambient temperature and under-hood temperature may be measured by one or more temperature sensors installed under a vehicle hood (e.g., near the fuel lines 228 220, or near the fuel separator 230, or temperature sensor 212 at fuel tank 200), mounted on a front vehicle bumper, or behind the vehicle front grill. Fuel system pressure may be measured by one or more pressure sensors positioned at fuel system 172. For example fuel system pressure may be measured by one or more of pressure sensor 211 at fuel tank 200, pressure sensor 238 at fuel separator 230, pressure sensor 223 in liquid fuel line 220, and a pressure sensor in either of gaseous fuel rail 205 or liquid fuel rail 206.

Solubilized gaseous fuel may also be separated from liquid fuel during conditions when the engine temperature is less than a threshold engine temperature because particulate emissions can increase when fuel droplets strike colder metal surfaces in the engine and fail to evaporate. Furthermore, amounts of liquid fuel on metal surfaces may also be increased at certain engine speed and engine load conditions where air fluid dynamics in the engine system entrain and direct the fuel spray closer to the walls of the engine system, such as the cylinder walls. Therefore controlling the fuel injector spray pattern may aid in controlling generation of particulate emissions during certain operating conditions when particulate emissions are likely. In one example, a look-up table may be used by control system 13 to predetermine engine load and engine speed conditions when particulate generation may occur. As such, under these predetermined engine load and engine speed conditions, solubilized gaseous fuel may be separated from liquid fuel so that liquid fuel injection may be reduced (and gaseous fuel injection may be increased) to reduce particulate emissions.

Fuel system 172 is shown coupled to refueling system 250. Refueling system 250 may be coupled to fuel tank 200 via tank access valve 218. Tank access valve 218 may be coupled to refueling conduit 260. Refueling conduit 260 may include high pressure refueling port 255. High pressure refueling port 255 may be configured to receive a pressurized gaseous fuel pump nozzle, or a fuel pump nozzle configured to deliver a pre-pressured mixture of liquid fuel and gaseous fuel. In some cases, a second high pressure refueling port may be included to allow compatibility with more than one type of high pressure fuel pump nozzle.

Access to high pressure refueling port 255 may be regulated by refueling lock 257. In some embodiments, refueling lock 257 may be a fuel cap locking mechanism. The fuel cap locking mechanism may be configured to automatically lock a fuel cap in a closed position so that the fuel cap cannot be opened. For example, the fuel cap may remain locked via refueling lock 257 while pressure in the fuel tank is greater than a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 257 may be a filler pipe valve located at a mouth of refueling conduit 260. In such embodiments, refueling lock 257 may prevent the insertion of a refueling pump into refueling conduit 260. The filler pipe valve may be electrically locked, for example by a solenoid, or mechanically locked, for example by a pressure diaphragm.

In some embodiments, refueling lock 257 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 257 is locked using an electrical mechanism, refueling lock 257 may be unlocked by commands from controller 12. In embodiments where refueling lock 257 is locked using a mechanical mechanism, refueling lock 257 may be unlocked via a pressure gradient.

Refueling conduit 260 may be coupled to low pressure refueling conduit 280. Low pressure refueling conduit 280 may be coupled to surge tank 270. Surge tank 270 may include a low pressure refueling port 265 and a liquid sensor 275. Low pressure refueling conduit 280 may include fuel pump 285 and check valve 290. Fuel pump 285 may only operate when fuel tank pressure is below a threshold, and may only operate when there is liquid fuel in surge tank 270, as sensed by liquid sensor 275. In this way, fuel pump 285 may not pump an air/fuel mixture into fuel tank 200. Further, when fuel tank pressure reaches a threshold, fuel pump 285 may be shut off by controller 12, causing liquid fuel to accumulate in surge tank 270. This may cause a low pressure liquid fuel dispenser nozzle engaged with low pressure refueling port 265 to turn itself off. Access to refueling port 265 may be regulated by refueling lock 267. Refueling lock 267 may comprise one of the examples described for refueling lock 257. Refueling locks 257 and 267 may further comprise different mechanisms.

In this manner, a fuel system may comprise a fuel tank on board a vehicle, the fuel tank including a gaseous fuel dissolved in a liquid fuel, a fuel injection system downstream from the fuel tank, the fuel injection system including gaseous fuel injectors and liquid fuel injectors, and a fuel separator fluidly coupled between the fuel tank and the fuel injection system. The fuel system may further comprise a bypass valve fluidly coupled between the fuel tank and the fuel injection system, wherein upon opening the bypass valve, fuel from the fuel tank is supplied to the fuel injection system while bypassing the fuel separator. The fuel separator may comprise a coalescing filter and an expansion chamber downstream from the coalescing filter, wherein a pressure in the expansion chamber is less than a pressure upstream of the coalescing filter, and upon filtering fuel through the coalescing filter, the gaseous fuel is desolubilized into the expansion chamber, and the liquid fuel is coalesced and retained upstream of the coalescing filter. The coalescing filter may comprise a steel fitted filter. Furthermore, the fuel system may further comprise a controller, including instructions executable to during a first condition, desolubilize and separate the gaseous fuel from the liquid fuel in the fuel separator, and supply the gaseous fuel and the liquid fuel to fuel injectors, and during a second condition, supply fuel from a fuel tank to the fuel injectors while bypassing the fuel separator.

Turning now to FIG. 3, it illustrates an example flow chart for a method 300 of operating an engine system and a fuel system. Method 300 may be executed by control strategy of controller 12 of control system 13. Method 300 begins at 310 where engine operating conditions such as engine on condition (EOC), engine temperature, fuel system pressure, engine torque, engine load, engine speed (RPM) and the like are measured and/or estimated. Method 300 continues at 320 where it determines if engine operating conditions may increase generation of particulate emissions. At 324, method 300 determines if an engine temperature, $T_{engine}$, is less than a threshold engine temperature, $T_{engine,TH}$. If $T_{engine} < T_{engine,TH}$, liquid fuel droplets may fail to evaporate when striking metal surfaces of the engine and may thereby increase generation of particulate emissions. If $T_{engine}$ is not less than $T_{engine,TH}$, method 300 continues at 328 where particulate generation is determined based on an engine speed and load. As an example, method 300 may reference a look-up table of predetermined engine speed and load to determine if particulate emissions may increase at the current engine speed and load conditions. If method 300 determines that particulate emissions may not increase or are low at the current engine speed and load, method 300 continues at 330.

At 330, method 300 determines if a gaseous fuel bubble formation may occur in the fuel system. At 334, method 300 determines if an ambient temperature, $T_{ambient}$, is greater than a threshold ambient temperature, $T_{ambient,TH}$. $T_{ambient}$ may also refer to a measured or estimated under-hood temperature or a fuel system temperature, as described above. If $T_{ambient} > T_{ambient,TH}$ gaseous fuel bubbles may be generated during fuel delivery to the engine, and fuel delivery reliability and robustness may be reduced. In one example, a fuel delivery volumetric flow rate may be lowered because of the expansion of gaseous fuel bubbles in a liquid fuel line. In another example, formation of gaseous fuel bubbles may cause cavitation in a liquid fuel line or at a DI fuel pump, reducing fuel delivery reliability and decreasing engine operability. In yet another example, fuel bubbles may affect fuel metering with fuel injectors, thus changing air/fuel ratio and degrading engine emissions. If $T_{ambient}$ is not greater than $T_{ambient,TH}$, method 300 continues at 338 where it determines if a fuel system pressure, $P_{fuelsys}$, is less than a threshold fuel system pressure, $P_{fuelsys,TH}$. If $P_{fuelsys} < P_{fuelsys,TH}$, gaseous fuel bubbles may be generated during fuel delivery to the engine, and fuel delivery reliability and robustness may be reduced. As described above, $P_{fuelsys}$ may be determined from one or more pressure sensors positioned at fuel system 172. For example fuel system pressure may be measured by one or more of pressure sensor 211 at fuel tank 200, pressure sensor 238 at fuel separator 230, pressure sensor 223 in liquid fuel line 220, and a pressure sensor in either of gaseous fuel rail 205 or liquid fuel rail 206.

If at 338, $P_{fuelsys} < P_{fuelsys,TH}$, method 300 continues at 340 where it determines if an engine load is less than a threshold engine load, $Load_{TH}$. Injection of gaseous fuel (especially via port fuel injection) may displace intake air in the engine cylinder or the engine intake air passage 146. As such, at high engine loads above $Load_{TH}$, displacing engine intake air may reduce available engine torque and decrease drivability and solubilized gaseous fuel may not be separated from liquid fuel to enable injection of solubilized gaseous fuel in liquid fuel. If engine load is not less than $Load_{TH}$, method 300 continues at 360, where it opens the fuel separator bypass valve 226 thereby directing the solubilized gaseous fuel and liquid fuel to bypass fuel line 228 and liquid fuel line 220. Furthermore, method 300 may position gaseous fuel switching valve 224 to fluidly connect fuel tank 200 with gaseous fuel line 221. Next, at 364, the mixture of solubilized gaseous fuel and liquid fuel may be injected via liquid fuel rail 206 and liquid fuel injectors 166A and 166B to the engine. Because method 300 determines that engine operating conditions are not conducive to generation of particulate emissions at 320, and are not conducive to generation of gaseous fuel bubbles at 330, the mixture of solubilized gaseous fuel and liquid fuel may be injected to the engine while maintaining fuel delivery reliability and robustness. After 364, method 300 ends.

If at 324 $T_{engine} < T_{engine,TH}$, at 328 particulate generation may increase, at 334 $T_{ambient} > T_{ambient,TH}$, at 338 $P_{fuelsys} < P_{fuelsys,TH}$, or at 340 engine load $< Load_{TH}$, method 300 proceeds to desolubilize and separate the gaseous fuel from the liquid fuel. At 370, method 300 closes the fuel separator bypass valve and positions gaseous fuel switching valve 224 to connect fuel separator 230 and gaseous fuel line 221. Next, at 372, method 300 directs the solubilized gaseous fuel and the liquid fuel to the fuel separator 230, for example, via fuel lift pump 210. Alternately, the pressure in fuel tank 210 may convey fuel from fuel tank 210. At 374, the gaseous fuel is desolubilized and separated from the liquid fuel in fuel separator 230. As an example, a pressure differential across coalescing filter 234 may desolubilize the gaseous fuel, whereby the gaseous fuel flows across the coalescing filter 234 to expansion chamber 232, and out of fuel separator 230 through gaseous fuel switching valve 224 to gaseous fuel line 221. As an example, a pressure in the expansion chamber may be less than a threshold pressure, for example less than 100 psi, in order to readily desolubilize the gaseous fuel from the liquid fuel. Liquid fuel droplets may condense on coalescing filter 234 where they may coalesce and then drop back to the sump chamber 236 where most of the liquid fuel collects before flowing out of fuel separator 230 to liquid fuel bypass line 228 and liquid fuel line 220. After the gaseous fuel and liquid fuel are separated in fuel separator 230, the gaseous fuel and the liquid fuel may be separately injected to the engine via the gaseous fuel injection system and the liquid fuel injection system at 376 and 378, respectively. Method 300 ends following 376 and 378.

In this manner, a method for an engine may comprise, on board a vehicle, supplying fuel from a fuel tank to a fuel separator, wherein the fuel comprises a gaseous fuel solubilized in a liquid fuel, desolubilizing the gaseous fuel from the liquid fuel in the fuel separator, and separating the gaseous fuel from the liquid fuel in the fuel separator. The method may further comprise injecting the desolubilized gaseous fuel into the engine via a gaseous fuel injector, and injecting the liquid fuel into the engine via a liquid fuel injector. Furthermore, desolubilizing the gaseous fuel from the liquid fuel may comprise filtering the fuel via a coalescing filter in the fuel separator. Further still, desolubilizing the gaseous fuel from the liquid fuel may comprise reducing a fuel pressure below a threshold pressure. Further still, the threshold pressure may comprise 100 psi. Further still, the gaseous fuel may be separated from the liquid fuel upstream of a fuel injector. The method may further comprise desolubilizing and separating the gaseous fuel from the liquid fuel in the fuel separator when an engine load is less than a threshold load.

In this manner, a method of delivering fuel to an engine may comprise, on board a vehicle, storing fuel in a fuel tank, wherein the fuel comprises a gaseous fuel solubilized in a liquid fuel, during a first condition, desolubilizing and separating the gaseous fuel from the liquid fuel in a fuel separator, and supplying the gaseous fuel and the liquid fuel to fuel injectors, and during a second condition, supplying fuel from the fuel tank to the fuel injectors while bypassing the fuel separator. The first condition may comprise when an engine load is less than a threshold engine load. Furthermore, the first condition may comprise when an engine temperature is less than a threshold engine temperature. Further still, the first condition may comprise when a fuel system pressure is lower than a threshold pressure. The second condition may comprise when an engine load is greater than a threshold engine load, when an engine temperature is greater than a threshold engine temperature, and when a fuel system pressure is lower than a threshold fuel system pressure. Furthermore, the fuel injectors may comprise gaseous fuel injectors and liquid fuel injectors, and the method may further comprise supplying the gaseous fuel to the gaseous fuel injectors and supplying the liquid fuel and the fuel to the liquid fuel injectors. Desolubilizing the gaseous fuel may comprise reducing a fuel pressure in the fuel separator below 100 psi. Desolubilizing the gaseous fuel may further comprise filtering the fuel through a coalescing filter.

Turning now to FIG. 4, it illustrates an example timeline 400 for operating an engine system and a fuel system, comprising a gaseous fuel and a liquid fuel. Timeline 400 includes timelines for fuel separator bypass valve status 910, gaseous fuel switching valve status 920, engine load 930, engine temperature 940, ambient temperature 950, fuel system pressure 960, and gas injection system status 970. Furthermore, timeline 400 includes $Load_{TH}$ 934, $T_{engine,TH}$ 944, $T_{ambient,TH}$ 954, and $P_{fuelsys,TH}$ 964. Prior to time t1, an engine load is less than $Load_{TH}$, $T_{engine} > T_{engine,TH}$, $T_{ambient} < T_{ambient,TH}$, $P_{fuelsys} > P_{fuelsys,TH}$, and gas injection system status is ON. Because particulate emission generation and gaseous fuel bubble generation resulting from engine operating conditions are low, a fuel separator bypass valve is OPEN and a gaseous fuel switching valve is positioned to fluidly couple the fuel tank with the gaseous fuel line. In this way a mixture of solubilized gaseous fuel and liquid fuel may be injected via liquid fuel injection system to engine.

At time t1, the engine load increases above $Load_{TH}$, for example when ascending a steep hill. In response, the fuel separator bypass valve may remain open and the gaseous fuel switching valve may remain positioned to couple a gaseous fuel line to the fuel tank to enable injection of a mixture of solubilized gaseous fuel and liquid fuel. Furthermore, gaseous fuel injection system status may be switched to OFF since injection of gaseous fuel at high loads may displace intake air, reducing available engine torque and reducing engine operability. In other examples, in response to an engine load increasing above $Load_{TH}$, gaseous fuel injection may be decreased. At time t2, engine load decreases below $Load_{TH}$. In response, the gaseous fuel injection system status is switched ON. Injection of gaseous fuel may be lower cost, lower carbon intensity (e.g., lower $CO_2$ generating), higher octane, and the like, relative to liquid.

At time t3, $T_{engine}$ decreases below $T_{engine,TH}$. In response, a fuel separator bypass valve may be closed and a gaseous fuel switching valve may be positioned to fluidly connect a fuel separator with a gaseous fuel line. In this way, solubilized gaseous fuel may be separated from liquid fuel, and gaseous fuel may be separately injected from liquid fuel. Since $T_{engine} < T_{engine,TH}$, particulate emissions may be increased when injected liquid fuel contacts cold metal engine surfaces. Separation of the gaseous fuel from the liquid fuel may enable increasing gaseous fuel injection while decreasing liquid fuel injection to reduce generation of particulate emissions. At time t4, $T_{engine}$ increases above $T_{engine,TH}$. In response, fuel separator bypass valve is opened and gaseous fuel switching valve is closed to allow injection of a mixture of solubilized gaseous fuel and liquid fuel.

At time t5, $T_{ambient}$ increases above $T_{ambient,TH}$. In response, a fuel separator bypass valve may be closed and a gaseous fuel switching valve may be positioned to fluidly connect a fuel separator with a gaseous fuel line. In this way, solubilized gaseous fuel may be separated from liquid fuel, and gaseous fuel may be separately injected from liquid fuel. Since $T_{ambient} > T_{ambient,TH}$ generation of gaseous fuel bubbles may increase when solubilized gaseous fuel in liquid fuel is conveyed in the fuel system and injected to the engine. Separation of the gaseous fuel from the liquid fuel may enable reducing generation of gaseous fuel bubbles in the fuel system, thereby increasing reliability and robustness of fuel delivery while separately injecting gaseous fuel and liquid fuel and while maintaining engine operability and vehicle drivability. At time t6, $T_{ambient}$ decreases below $T_{ambient,TH}$. In response, fuel separator bypass valve is opened and gaseous fuel switching valve is closed to allow injection of a mixture of solubilized gaseous fuel and liquid fuel.

At time t7, $P_{fuelsys}$ decreases below $P_{fuelsys,TH}$. In response, a fuel separator bypass valve may be closed and a gaseous fuel switching valve may be positioned to fluidly connect a fuel separator with a gaseous fuel line. In this way, solubilized gaseous fuel may be separated from liquid fuel, and gaseous fuel may be separately injected from liquid fuel. Since $P_{fuelsys}<P_{fuelsys,TH}$, generation of gaseous fuel bubbles may increase when solubilized gaseous fuel in liquid fuel is conveyed in the fuel system and injected to the engine. Separation of the gaseous fuel from the liquid fuel may enable reducing generation of gaseous fuel bubbles in the fuel system, thereby increasing reliability and robustness of fuel delivery while separately injecting gaseous fuel and liquid fuel and while maintaining engine operability and vehicle drivability. At time t8, $P_{fuelsys}$ increases above $P_{fuelsys,TH}$. In response, fuel separator bypass valve is opened and gaseous fuel switching valve is closed to allow injection of a mixture of solubilized gaseous fuel and liquid fuel.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of delivering fuel to an engine, comprising: on board a vehicle, storing fuel in a fuel tank, wherein the fuel comprises a gaseous fuel solubilized in a liquid fuel;
during a first condition,
desolubilizing and separating the gaseous fuel from the liquid fuel in a fuel separator, and supplying the gaseous fuel and the liquid fuel to fuel injectors, where desolubilizing the gaseous fuel comprises reducing a fuel pressure in the fuel separator; and
during a second condition,
supplying mixed fuel from the fuel tank to the fuel injectors while bypassing the fuel separator.

2. The method of claim 1, wherein the first condition comprises when an engine load is less than a threshold engine load.

3. The method of claim 1, wherein the first condition comprises when an engine temperature is less than a threshold engine temperature.

4. The method of claim 1, wherein the first condition comprises when a fuel system pressure is lower than a threshold pressure or when an ambient temperature is lower than a threshold temperature.

5. The method of claim 1, wherein the second condition comprises when an engine load is greater than a threshold engine load, when an engine temperature is greater than a threshold engine temperature, when a fuel system pressure is greater than a threshold fuel system pressure, or when an ambient temperature is higher than a threshold temperature.

6. The method of claim 1, wherein the fuel injectors comprise gaseous fuel injectors and liquid fuel injectors, and further comprising supplying the gaseous fuel to the gaseous fuel injectors and supplying the liquid fuel and the mixed fuel to the liquid fuel injectors.

7. The method of claim 1, wherein desolubilizing the gaseous fuel further comprises reducing the fuel pressure in the fuel separator below 100 psi.

8. The method of claim 7, wherein desolubilizing the gaseous fuel further comprises filtering the fuel through a coalescing filter.

* * * * *